United States Patent [19]

Siegel

[11] Patent Number: 5,261,072
[45] Date of Patent: Nov. 9, 1993

[54] COMPACT DISK DATA TRANSFER SYSTEM USING CACHE MEMORY

[75] Inventor: Mark D. Siegel, Fort Worth, Tex.

[73] Assignee: Tandy Corporation, Fort Worth, Tex.

[21] Appl. No.: 785,486

[22] Filed: Oct. 31, 1991

[51] Int. Cl.$^5$ .......................... G11C 7/00; G06F 13/00; G06F 13/10; G06F 13/28

[52] U.S. Cl. .............................. 395/425; 364/DIG. 1; 364/242.3; 364/242.31; 364/243.41; 364/248.1; 364/952

[58] Field of Search .................. 395/425; 364/DIG. 1, 364/DIG. 2, 243.41, 242.3, 242.31, 248.1, 952.1, 966.3; 365/94, 234; 369/59, 273

[56] References Cited

U.S. PATENT DOCUMENTS

| | | | |
|---|---|---|---|
| 4,876,651 | 10/1989 | Dawson et al. | 364/449 |
| 4,941,125 | 7/1990 | Boyne | 364/DIG. 2 |
| 4,965,801 | 10/1990 | DuLac | 364/DIG. 2 |
| 5,012,407 | 4/1991 | Finn | 364/DIG. 1 |
| 5,034,914 | 7/1991 | Osterlund | 364/DIG. 2 |
| 5,043,967 | 8/1991 | Gregg et al. | 364/DIG. 2 |
| 5,146,576 | 9/1992 | Bearsdley et al. | 395/425 |
| 5,218,685 | 6/1993 | Jones | 395/425 |

Primary Examiner—Alyssa H. Bowler
Attorney, Agent, or Firm—David L. McCombs

[57] ABSTRACT

Method and apparatus for continuously reading data from a compact disk drive to a host computer is disclosed in which the data is transferred to the computer's cache memory so that it is available to the computer's central processor for processing without interruption. A communication link is established between a processor in the disk drive and a direct memory access (DMA) controller in the host computer. With this link established, the DMA controller directs the transfer of the incoming data stream from the drive to the cache memory of the host computer. Once the data is in the cache memory, it is moved to the application workspace of the computer's system random access memory (RAM) for processing by the central processor. The transfer of data by the DMA controller, and the temporary storage of the transferred data in the cache memory, allows for continuous transfer of data from the compact disk drive, without interruption, and without the need for reseeks of the data. The invention is implemented in software by executing a software call from a supervisory program operating in the host computer.

7 Claims, 2 Drawing Sheets

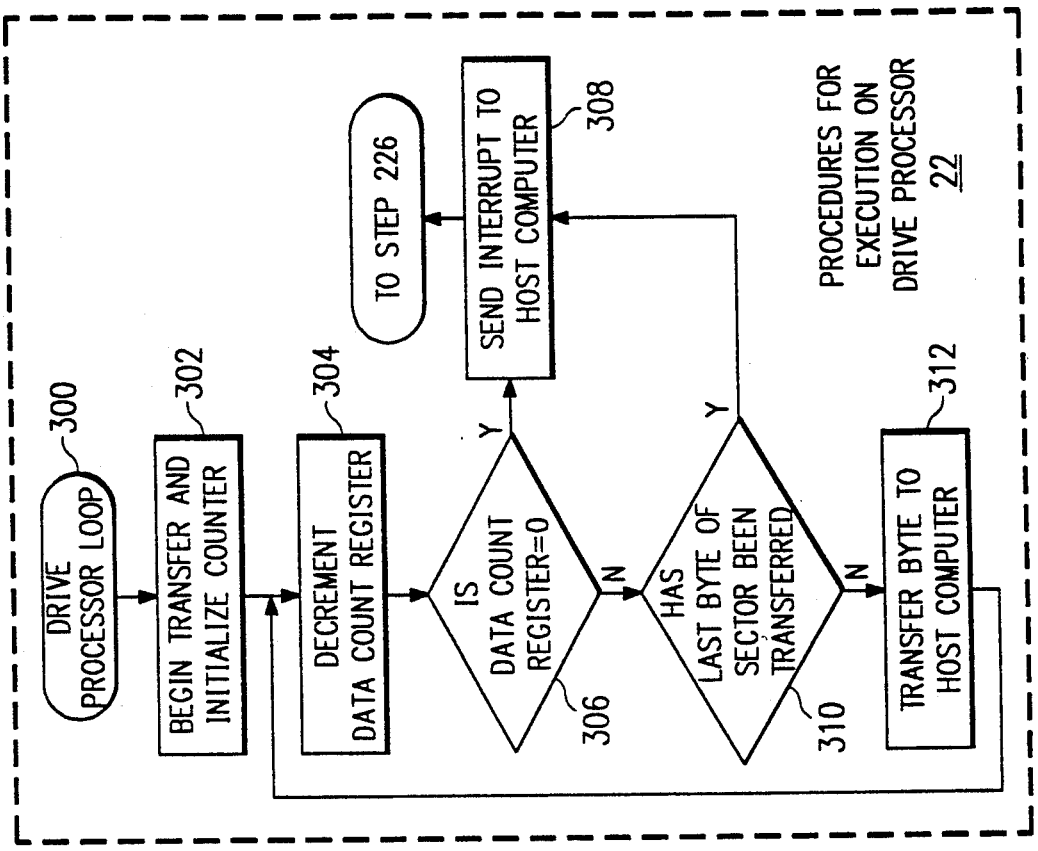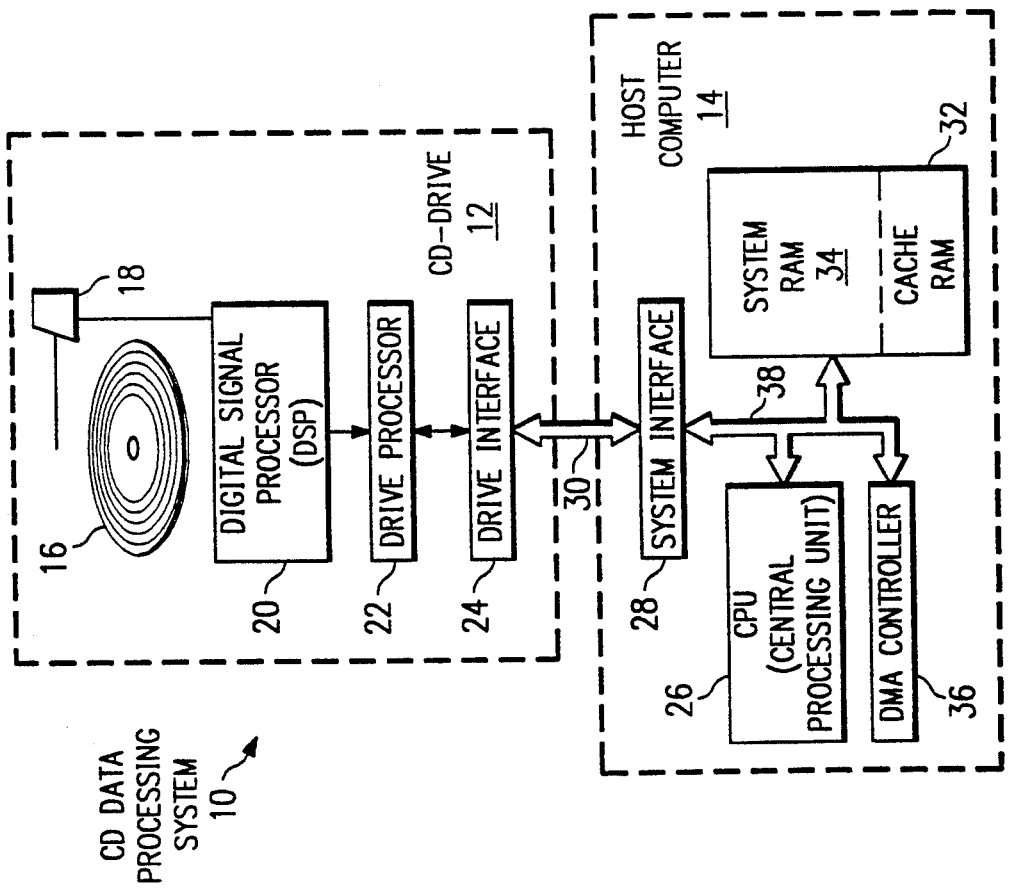

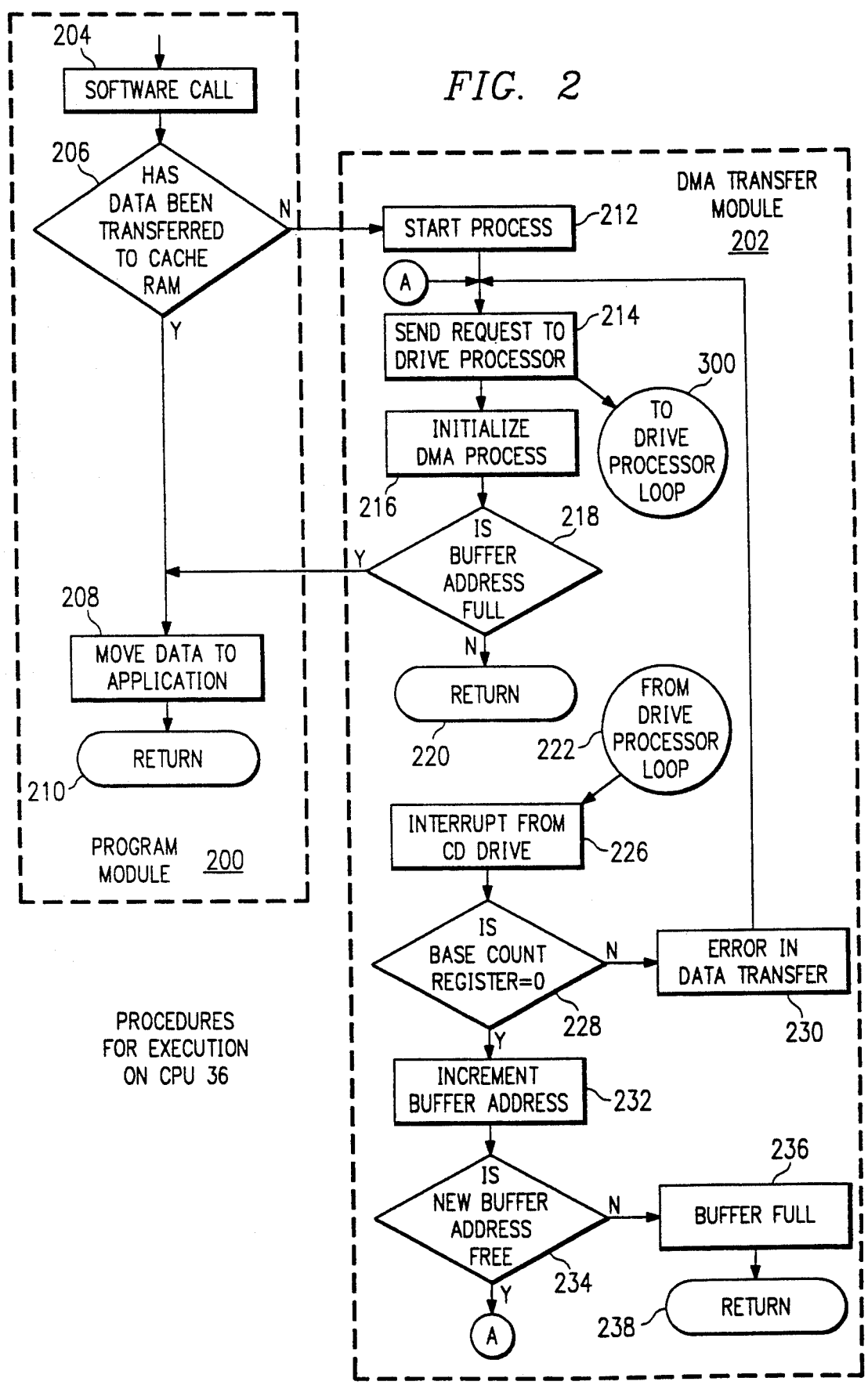

COMPACT DISK DATA TRANSFER SYSTEM USING CACHE MEMORY

FIELD OF THE INVENTION

The present invention relates generally to a compact disk (CD) data storage and processing system and particularly to a method and apparatus for improved data transfer between a compact disk drive and a host computer utilizing the host computer's cache memory.

BACKGROUND OF THE INVENTION

An optical disk or compact disk (CD) is a nonmagnetic data storage medium on which relatively large amounts of digital information can be stored by using a laser beam to burn microscopic indentions into the surface of the medium. The stored data can be read using a lower-power laser to sense the presence or absence of the indentions. A compact disk read-only-memory (CD-ROM) is a play only optical storage medium onto which data can be stored only once and then read repetitively. A compact disk direct-read-after-write (CD-DRAW), also referred to as a write-once read-many (WORM) disk, is a similar optical storage medium especially adapted so that data can be written onto the medium by a user. Also available are opto-magnetic disks on which both data recording and data reproduction are feasible by the user.

All of the above optical storage media offer improved density storage capacity over conventional magnetic tape or disk media. For example, a five-inch CD-ROM disk is capable of storing as much as 620 megabytes of data while a standard, 5¼ inch magnetic floppy disk can only store 1.2 megabytes of data. Such storage capacity, available in a relatively small removable medium, has led to a wide variety of applications for the optical storage and subsequent processing of data. Compact disks and associated processors embodying this technology are available for applications that include audio and video recording and playback, computer animation, interactive and multimedia computer games, text storage and other computer program, data and graphics applications. A commercially available audio CD, for example, is a 5-inch disk capable of storing over 72 minutes of continuous music for reproduction on a playback device.

Due to the popularity of the audio CD, an industry standard has been developed for compact disk specifications, recording format and error detection/correction techniques, driven primarily by the requirements for storing and reproducing audio information. For instance, data on a CD is stored in one long continuous track extending spirally from the center of the disk, divided along the circumferential direction thereof into a plurality of equiangular unit storage regions or sectors. Data is stored in this manner to allow an optical read head of a CD reader drive to position itself at a location on the track, and then follow that track from beginning to end, delivering continuous music without breaks or gaps in the sound. While such a format is ideal for storing data that is contiguous in nature, it creates problems when the stored data requires intermittent processing.

In general purpose computer systems, the requirements for accessing data are different from that of the audio market. Rarely will data that is placed on a floppy or hard disk be read in a contiguous fashion. Rather, the computer will request a portion of data, process that data, request more data, process that and so on. Thus, to allow for such intermittent reading and processing, floppy and hard disks are designed to provide for quick access to the data stored on them.

To allow for such quick access, data is stored on floppy and hard disks in a plurality of concentric tracks with the tracks divided into a plurality of equally spaced sectors. Since the tracks on floppy and hard disks are concentric, the exact radial position of each track can be easily calculated. Thus, when a computer needs to read particular data from a floppy or hard disk, the location of the track containing the data is calculated, the read head of the disk drive is positioned over the track and the data is provided to the computer.

Unlike floppy or hard disks, the exact position of a particular track or sector on a CD cannot be easily calculated since the radial position of the track varies with the rotation of the disk. As a result, when a computer requests information from a CD, the optical read head cannot be placed directly over the track containing the required data. Instead, the radial position of the track containing the data is approximated the optical read head is placed one or two spirals in front of the track containing the data, and the read head follows the track until the desired data is reached. Such approximation in locating the track containing the data stored on a CD leads to delays or gaps in processing the desired data, as well as gaps in the presentation of processed data to the user, all of which are unacceptable in many applications.

The foregoing problems are likely to be manifested in a system for reproducing both video and audio information contained on a CD, such as in a multimedia computer system. A CD for a multimedia computer system containing data for a video presentation, game or the like contains both audio and video data interleaved throughout the data sectors on the disk (e.g., audio sector, video sector, video sector, audio sector, etc.). When the optical read head of a CD drive is positioned at the beginning of a track, it delivers data to a multimedia computer that is responsible for both playing audio and displaying video. Due to the processing requirements for displaying video, the multimedia computer may not be able to process the data received from the CD drive as fast as it is read by the drive. Thus when the multimedia computer has completed processing a portion of the video and is ready for the next sector of data, the CD drive will have passed the sector containing the desired data. The multimedia computer must therefore initiate a "reseek" of the data, requiring the CD drive to reposition the optical read head one or two spirals in front of the track containing the desired data and follow the spiral until the desired data is reached. Such a "reseek" results in a break or gap in the data transferred from the CD drive to the multimedia computer, and thus a break or gap in the audio and video signals processed by the multimedia computer.

To compensate for problems associated with reseeks on a CD drive, and to reduce or eliminate the breaks or gaps in data being read and transferred by a CD drive, known optical drives include a cache random access memory (RAM) associated with the drive's internal processor to temporarily store data that is read from a CD. When the drive's processor requests particular data, it is read and stored in the cache RAM until an external host computer, such as a multimedia computer, requests the particular data. When the host computer requests the particular data, it is accessed directly from the cache RAM in the drive. Depending on the size of the cache RAM, and thus the amount of data that may be stored therein, the number of reseeks required is substantially reduced or eliminated. This improves the reader's throughput to the host computer and eliminates the breaks or gaps in presenting data to the host computer caused by delays associated with locating a particular data block or caused by reseeking of data.

There are numerous disadvantages in providing an optical drive with cache RAM. Cache RAM is very expensive and adds to the cost of the drive. Depending on the amount of cache RAM required, the cost of the cache RAM could equal that of the drive. In addition, the amount of cache RAM necessary to limit reseeks differs with the particular application, making it difficult to provide a single drive product adaptable for universal use. Further, a drive adaptable to manage a variety of different cache RAM sizes would result in a more complex arrangement.

SUMMARY OF INVENTION

The foregoing problems are solved and a technical advance is achieved by a method and apparatus of the present invention in which data is continuously read from a compact disk and is transferred to the cache memory of an associated host computer whereby the data is available for processing by the computer's central processor without interruption. In a departure from the art, the continuous transfer to a host computer of audio and video data contained on a compact disk is accomplished by establishing a communication link between a processor in a disk drive and a direct memory access (DMA) controller in the host computer. With this link established, the DMA controller directs the transfer of the incoming compact disk data stream from the drive to a cache memory location of the host computer. Once the data is in the cache memory, it is moved to the application workspace of the computer's system random access memory (RAM). The data is then available in the system RAM for processing by the central processor. The temporary storage of data from the disk to the cache memory is performed asynchronously to the processing of the central processor allowing continuous transfer of data without breaks or reseeks.

In an illustrative embodiment of the invention, the apparatus includes a cache memory in a host computer for storing data read from a storage medium. An arrangement is provided for transferring the data read from the storage medium to the cache memory for access and processing by the central processor of the host computer. The apparatus thus allows for the continuous delivery of data read from the storage medium to the host computer such that the data is available to the central processor for processing without interruption caused by a noncontinuous flow of data from the storage medium. In one aspect of the invention, when the cache memory receiving the transferred data is full the data is moved to the system memory of the host computer. The data is then accessed from the system memory by the central processor of the host computer for processing. The apparatus further includes a drive for continuously reading the data from the storage medium and transferring the data to the associated host device.

In another aspect, the present invention is implemented in software by executing a software call from a supervisory program operating in the host computer.

Modules of software are executed in both the host computer and the drive interact in a call interrupt fashion. If a software module determines that data has been transferred from the drive to the cache memory, the data is moved to the system memory for processing by the central processor. If data has not been transferred to the cache memory, procedures in a transfer module and associated drive processor module are implemented to accomplish the transfer.

An important technical advantage achieved with the present invention is that the transfer of data from a compact disk to an associated host computer is accomplished asynchronously from the processing functions of the computer's central processor thus freeing the central processor to perform other tasks while the disk drive seeks for requested data and transfers it to the cache memory under the direction the DMA controller.

An additional technical advantage achieved with this invention is improved efficiency in data transfer rate between the compact disk drive and the host computer since the transfer rate is dependent on the amount of cache memory allocated to the DMA controller rather than on the processing availability of the host central processor.

BRIEF DESCRIPTION OF THE DRAWINGS

FIG. 1 is a functional block diagram of the compact disk data of the present invention; and FIGS. 2 and 3 flowcharts illustrating the logic for implementing the data transfer techniques of the present invention.

DESCRIPTION OF THE PREFERRED EMBODIMENTS

In FIG. 1, the reference numeral 10 refers to a compact disk (CD) data processing system embodying features of the present invention. The system 10 includes a compact disk drive 12 connected to a host computer 14. In an illustrative embodiment, the system 10 is a multimedia computer system for processing data stored on a compact disk 16. Audio and video data (not shown) contained on the disk 16 are read from the disk 16 by the CD drive 12, and transferred to the host computer 14 for processing. While not shown, it is understood that the processed data is then presented to a user through an audio and video interface arrangement such as a monitor, television, speakers or other video and audio component combinations. Efficient transfer of data to be processed to the host computer 14 by the CD drive 12 is an important aspect of the system 10 addressed by the present invention, as described in detail below.

The CD drive 12 includes a laser read head 18, a digital signal processor (DSP) 20, a drive processor 22 and a drive interface 24. While not shown, the disk 16 is supported within the drive 12 for rotational motion relative to the head 18. The head 18 is located over the disk 16 to optically read data contained on the disk 16. Data is stored on the disk 16 along a continuous spiral track (not shown), the track being divided along the circumferential direction into equiangular sectors (also not shown). The head 18 is movable relative to the disk 16 so that it can be positioned over a particular track and follow the track as the disk 16 is rotated to read the desired data.

The DSP 20 is connected to the head 18 and receives the optically read data from the disk 16. The DSP 20 converts the data to digital form in a conventional manner. The drive processor 22 receives the digital data from the DSP 20 for transmission to the drive interface 24. While not shown, it is understood that the processor 22 includes control logic for locating data on the disk 16, initiating movement of the head 18 to the correct sector for the data, and reading the data on the disk 16. The drive interface 24 enables transfer of data and control signals between the processor 22 and the computer 14. In accordance with the present invention, the drive 12 does not require on-board cache memory to store data being read from the disk 16. The computer 14 instead utilizes its own cache memory for this purpose as described below.

The host computer 14 is a commercially available personal computer (PC) that includes a central processing unit (CPU) 26 electrically connected to a system interface 28. A peripheral bus 30 connects the system interface 28 to the drive 12. While not shown, it is understood that additional peripheral devices such as displays, keyboards, joysticks and printers, etc. may be connected as desired to the computer 14. The host computer 14 also includes a cache RAM 32, a system RAM 34 and a direct memory access (DMA) controller 36 interconnected by an internal system bus 38. The system bus 38 is also connected to the CPU 26 and the system interface 28. According to an aspect of the present invention, the cache memory 32 is utilized to temporarily store data read by the drive 12, as further discussed below.

It is understood that the components of the host computer 14 are embodied as separate integrated circuit modules which are mounted on a conventional printed circuit board (not shown). The CPU 26, the system RAM 34 and the other conventional components of the computer 14 function in a manner well known in the art and therefore are not discussed further.

In operation of the system 10, the host computer 14 requests the CD drive 12 to read data from the disk 16, and transfers that data to the host computer 14 for processing. The host computer 14 initiates the data transfer by establishing a communication link between the CD drive 12 and the host computer 14 via the peripheral bus 30. More specifically, the CPU 26 initializes the DMA controller 40 to receive a block of data (e.g., two kilobytes) from the CD drive 12. The CPU 26 then transmits a request for data transfer to the drive processor 22 via the system interface 28 and the drive interface 24. The drive processor 22 then initiates the optical read head 18 to read the requested data. The read head 18 reads the requested data from the disk 16 and transfers this data to the DSP 20. The DSP 20 digitizes the read data and transfers it to the drive processor 22. The drive processor 22 then presents the read data to the host computer 14 via the peripheral bus 30. The DMA controller 36 directs the read data into the cache RAM 32 via the system bus 38. This process of reading the requested data from the disk 16 and transferring the data to the cache RAM 32 continues until the requested block of information has been transferred. It is understood that the CD drive 12 transfers to the host computer 14 one byte of data at a time, with the entire block of data being transferred sequentially. The data stored in the cache RAM 32 is then moved into the system RAM 34. The data is thus available to the CPU 26 in the system RAM 34 as needed without delays associated with locating, transferring or reseeking the data from the disk 16.

FIGS. 2 and 3 depict a flow chart illustrating control logic for operating the system 10 in accordance with the present invention. It is understood that the logic may be implemented by computer program instructions executed within the drive processor 22 and also within the CPU 26. FIG. 2 relates to control logic executed by the CPU 26 for operating the host computer 14 in accordance with the present invention and FIG. 3 illustrates control logic executed by the drive processor 22 for operating the CD-drive 12 in accordance with the present invention. The control logic programs executed by the processors 22 and 26 cause the CD drive 12 and the host computer 14 interact in a call-interrupt fashion as described below.

FIG. 2 illustrates a program module 200 and a DMA transfer module 202 define the procedures executed by the CPU 26 for supervising the transfer of data from the CD drive 12 to the host computer 14 and handling the tasks associated with transferring data from the CD drive 12 to the cache RAM 32 in the host processor 14, respectively. It is understood that software calls are made to the module 200 by a supervisory application program (not shown) being executed by the CPU needing data from the disk 16.

At step 204, execution begins with a software call from the supervisory application program being executed by the CPU 26 to the program module 200 for the purpose of obtaining data from the disk 16 for processing. At step 206, a decision is made to determine if the CD drive 12 has already transferred the requested data from the CD drive 12 to the cache RAM 32, as discussed below. If the data has been transferred to the cache RAM 32, execution proceeds to step 208. At step 208, the CPU 36 instructs the DMA controller 36 to move the transferred data from the cache RAM 32 to the system RAM 34 for processing by the CPU 26. Execution then returns to the calling supervisory application program at step 210.

If at step 206, it is determined that the requested data has not been transferred to the cache RAM 32, a software call is made to the DMA transfer module 202. At step 212, the process of transferring the requested data from the CD drive 12 to the cache RAM 32 in the host computer 14 is started. At step 214, the CPU 26 sends a request command to the drive processor 22 via the interfaces 24 and 28 to read the requested data. This request command to the drive processor 22 initiates a drive processor loop, at step 300, which causes the requested data to be read from the disk 16 and presented to the host computer 14 via the peripheral bus 30. The drive processor loop beginning at step 300 is discussed in FIG. 3 below. At step 216, the CPU 26 initializes the DMA controller 36 to transfer data from the CD drive 12 directly to the cache RAM 32 for storage. More specifically, the CPU 26 initializes the DMA controller 36 by providing it with base count information and buffer address information. A base count register (not shown) in the DMA controller 36 is initialized with the base count information to keep track of the number of bytes that are left to be transferred before the operation is terminated or reinitialized. This base count register is initialized with a value corresponding to approximately 2000 bytes (one block) of the data requested to be transferred. A base address register (not shown) of the DMA controller 36 is also initialized with buffer address information corresponding to the location in the cache RAM 32 where the first block of data is to be stored. This address area of the cache RAM 32 is used to store the block of data transferred from the CD drive 12 by the DMA controller 36. It is understood that the size and location of the cache RAM 32 address may be enlarged or reduced to meet the demands of the particular application. Although not illustrated in FIG. 2, it is understood that as each byte or word of data is transferred by the DMA controller 36 to the cache RAM 32, the DMA controller 36 decrements its base count register.

At step 218, a decision is made whether the cache RAM buffer address corresponding to the address register of the DMA controller 36 currently contains transferred data. If not, execution proceeds to step 220. At step 220, execution returns to the supervisory application program. The CPU 26 is free to continue processing other data while the DMA controller 36 receives the requested data from the CD drive 12, via the peripheral bus 30, and stores it in the cache RAM 32, as discussed in FIG. 3. If at step 218 the buffer address does contain data transferred from the CD drive 12, execution proceeds to step 208 of the program module 200 where the DMA controller 36 moves the transferred data to the system RAM 34 for processing as discussed above.

At step 222, execution returns to the DMA transfer module 202 in response to an interrupt received from the CD drive 12. The interrupt is determined by the logic of the processor loop discussed in FIG. 3 below. The drive 12 sends an interrupt to the CPU 26 either to indicate that an error has occurred in the transfer of data from the drive 12, or that data transfer from the drive 12 to the cache RAM 32 is completed. At step 226, the interrupt is received from the drive 12.

At step 228 a determination is made whether the base count register (initialized in step 216) has been decremented to zero. If the register has been decremented to zero, this indicates that all of the requested data has been transferred. If the register has not decremented to zero, the CPU 36 recognizes that an error has occurred, because an interrupt occurred without all of the requested data being transferred. Recognition of this error condition occurs at step 230. At step 230, the error in data transfer causes execution to return to step 214 to restart the data transfer process.

If at step 228 the base count register does equal zero, the CPU 36 recognizes that all of the requested data was transferred without error. Execution then proceeds to step 232. At step 232 the base address register that was initialized in step 216 is incremented to the next address, corresponding to the data area in the cache RAM 32 in which the next block of data is to be stored. At step 234, a determination is made whether the data address for the cache RAM 32 that corresponds to the incremented base address register is empty, i.e., is able to store new data, or is full, i.e., currently contains requested data. If the data address in the cache RAM 32 corresponding to the incremented base address register is empty, execution returns to step 214 where the CPU 26 requests another block of data to be transferred. If at step 234 the data area in the cache RAM 32 corresponding to the incremented base address register is full, execution proceeds to step 236. At step 236, all of the requested data has been transferred from the disk 16 in the CD drive 12 to the cache RAM 32 in the host computer 14 At step 238 execution returns from the DMA transfer module 202 to the calling supervisory application. Accordingly, data stored in the cache RAM 32 is available to the CPU 36 for processing, without interruption or reseeking of the requested data by the CD drive 12.

Referring to FIG. 3, at step 300 a request command for data from the disk 16 is sent to the CD drive 12 by a software call from step 214 of the DMA transfer module 202. The request is handled by the logic of a drive processor loop executed in the drive processor 22. At step 302, execution in the drive processor 22 proceeds by initializing a data count register (not shown) that is responsible for keeping track of the number of data bytes that remain to be transferred from the drive 12 to the host computer 14. The data count register is initialized with a value corresponding to the number of bytes to be transferred from the CD drive 12 to the host computer 14, typically 2000 bytes (one block). Once the data count register is initialized, data transfer begins from the drive 12 to the cache RAM 32 of the computer 14, as discussed below.

At step 304 the data count register is decremented. At step 306 a determination is made whether the data count register has been decremented to zero. If the data count register has been decremented to zero, the drive processor 22 recognizes that all the requested data has been transferred to the cache RAM 32 of the host computer 14. At step 308, an interrupt is sent to the CPU 26 in the host computer 14 via the interfaces 24 and 28, to let the host computer 14 know that the requested data has been transferred. Execution then returns to the DMA transfer module 202 at step 222.

If at step 306 the data count register has not been decremented to zero, execution proceeds to step 310. At step 310, a determination is made whether the last byte that was transferred to the host computer was the last byte in the sector on the disk 16 containing the requested data. If at step 310 the last byte in the sector containing the requested data has been transferred, the drive processor 22 sends an interrupt, per step 308, notifying the host computer 14 that data transfer has been completed. If at step 310 the last byte of the sector has not been transferred, execution proceeds to step 312.

At step 312, the drive processor 22, not having reached the end of the data transfer, or the last byte in the sector, transfers a byte of data to the host computer 14 via the interfaces 24 and 28. Upon completion of the transfer of the byte of data, execution returns to step 304 to continue transferring the requested data to the host computer 14. This process of transferring data from the disk 16 to the host computer 14 continues until either the DMA controller 36 detects a base count register equal to zero, at step 228, or the drive processor 22 sends an interrupt, at step 308, indicating that all of the data has been transferred, or that the last byte in a sector has been transferred.

It is understood that the process of transferring data from the CD drive 12 to the host computer 14, as demonstrated in FIG. 3 is accomplished through hardware handshaking over the peripheral bus 30 between the drive processor 22 and the DMA controller 36. Once the CPU 26 initializes the data transfer, at steps 214 and 216, the CPU 26 returns to executing the supervisory program while the DMA controller 36 and the drive processor 22 perform the data transfer. It is only when an interrupt occurs from the CD drive 12 or from the DMA controller 36, to the host computer 14 that the CPU 26 is required to perform steps relating to data transfer.

It is understood that variations may be made in the present invention without departing from the spirit and scope of the invention. For example, the system 10 may be used for the storage, transfer and processing of data to be continuously read from other types of optical, opto-magnetic or digital playback/recording storage media. Further, the drive and host computer associated with the storage medium may comprise other appliances, it being understood that other cache memory data transfer environments are contemplated.

Although illustrative embodiments of the invention have been shown and described, a latitude of modification, change and substitution is intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. Apparatus for controlling a transfer of data from an optical disk to a system memory of a personal computer, said system memory including a cache memory portion and an application program memory portion, said data being temporarily stored and accessed for processing from said system memory without interruption of processing caused by a noncontinuous flow of data from the optical disk, the apparatus comprising:
   a compact disk drive connected to said computer for reading data continuously from said optical disk;
   a direct memory access controller connected to said system memory for transferring said continuously read data from said optical disk to said cache memory; and
   a central processing unit of said personal computer connected to said direct memory access controller and said system memory for requesting the continuous reading of data from said optical disk, establishing a communication link between said drive and said direct memory access controller to initiate the transfer of said data directly to said cache memory asynchronously of processing of said data thereby permitting a continuous flow of data from said drive, moving said data from said cache memory to said application program memory, and processing said data after said movement to said application program memory.

2. Apparatus for the continuous delivery of data read from an optical disk to a computer having a central processor and a system memory in which the data is available to the central processor for processing without interruption caused by the noncontinuous flow of data from the disk, the apparatus comprising:
   a drive for continuously reading said data from said storage medium;
   a cache memory portion of said system memory for temporarily storing said read data and an application program memory portion of said system memory from which said data may be accessed by said central processor for processing; and
   direct memory access control means for controlling the transfer of said read data from said drive directly to said cache memory asynchronously from the processing of said data by said central processor to permit a continuous flow of data from said device, and for transferring said data from said cache memory directly to said application program memory, said data being accessed for processing by said central processor from said application program memory.

3. The apparatus of claim 2 wherein said data is moved from said cache memory to said application program memory when a portion of said cache memory contains said transferred data.

4. The apparatus of claim 2 wherein said data is moved from said cache memory to said application program memory when said cache memory is full of said transferred data.

5. A method for transferring data read by a drive from an optical storage medium for continuous delivery to a computer device having a central processor for executing application programs using the data, a system memory including a cable memory portion and an application program memory portion in which the data is available to the central processor for processing without interruption caused by the noncontinuous flow of data from the storage medium, the method comprising:
   executing a software call from an application program being executed by said device;
   determining whether data from said storage medium has been transferred to said cache memory of said device;
   initiating a transfer process for transferring data read from said storage medium from said drive directly to said cache memory asynchronously of processing in said central processor to permit continuous flow of data to said device;
   moving data directly to said application program from said cache memory for processing by said central processor after data has been transferred to said cache memory; and
   returning to said execution of said application program.

6. The method of claim 5 in which said step of initiating a transfer process further comprises:
   requesting the continuous reading of data from said storage medium;
   initializing a base address register corresponding to said cache memory;
   transferring data read from said storage medium to said cache memory of said device;
   sending an interrupt from said storage medium to said host device when said data has been transferred to said cache memory;
   incrementing said base address register responsive to said interrupt;
   determining whether the next base address in said cache memory corresponding to said incremented base address register contains unprocessed data;
   returning to said requesting step when said next base address does not contain unprocessed data; and
   returning to said application program when said next base address contains unprocessed data.

7. A method for transferring data read by a drive from a compact disk storage medium for continuous delivery to a computer device having a central processor for executing application programs using the data, a system memory including a cache memory portion and a system memory portion in which the data is available to the central processor for processing without interruption of the processing caused by the noncontinuous flow of data from the storage medium, the method comprising:
   requesting the continuous reading of data from said storage medium;
   initializing a base address register corresponding to a location in said cache memory;
   initializing the base count register to a value which corresponds to an amount of data to be transferred;
   transferring data read from said storage medium from said drive directly to said cache memory of said device asynchronously of processing of said data in said central processor to permit a continuous flow of data from said device;

changing said value of said base count register in response to said transfer of data;

determining whether said base count register has been changed to reflect the transfer of said amount of data;

returning to said transferring step when said base count register does not reflect the transfer of said amount of data;

sending an interrupt to said host device when said base count register reflects the transfer of said amount of data;

incrementing said base address register responsive to said interrupt;

determining whether the next base address in said cache memory corresponding to said incremented base address register contains unprocessed data;

returning to said requesting step when said next base address does not contain unprocessed data; and moving data to said application program memory for processing by said device processor when said next base address contains unprocessed data.

* * * * *

UNITED STATES PATENT AND TRADEMARK OFFICE
CERTIFICATE OF CORRECTION

PATENT NO. : 5,261,072

DATED : November 9, 1993

INVENTOR(S) : Mark D. Siegel

It is certified that error appears in the above-identified patent and that said Letters Patent is hereby corrected as shown below:

Col. 4, line 29, "FIGS. 2 and 3 flowcharts" should be --FIGS. 2 and 3 are flowcharts--.

Col. 10, line 9, "cable memory" should be --cache memory--.

Signed and Sealed this

Third Day of May, 1994

Attest:

BRUCE LEHMAN

Attesting Officer    Commissioner of Patents and Trademarks